United States Patent [19]
Holt et al.

[11] 3,734,429
[45] May 22, 1973

[54] TARGET AIRCRAFT FLIGHT TERMINATION SYSTEM

[75] Inventors: Lloyd J. Holt, Ridgecrest; Harry L. Myers; Gordon F. Zurn, Jr., both of China Lake, all of Calif.

[73] Assignee: The United States of America as represented by the Secretary of the Navy, Washington, D.C.

[22] Filed: July 16, 1971

[21] Appl. No.: 163,227

[52] U.S. Cl. .................................. 244/1 R, 102/24
[51] Int. Cl. ......................... B64c 39/00, C06c 5/04
[58] Field of Search ................. 244/1 R, 3.25, 135; 102/7.2, 49.4, 49.5, 70.2 R, 7, 24; 60/254, 256

[56] References Cited
UNITED STATES PATENTS

| | | | |
|---|---|---|---|
| 2,965,032 | 12/1960 | Borcher et al. | 102/70.2 R X |
| 3,048,107 | 8/1962 | Samms | 102/49.5 |
| 3,279,189 | 10/1966 | Kerr et al. | 60/256 |
| 3,311,324 | 3/1967 | Holt et al. | 244/1 R |
| 3,357,190 | 12/1967 | Cassidy et al. | 60/256 |
| 3,422,763 | 1/1969 | Wait | 102/70.2 R X |

*Primary Examiner*—Duane A. Reger
*Assistant Examiner*—Barry L. Kelmachter
*Attorneys*—R. S. Sciascia, Ray Miller and Gerald F. Baker

[57] ABSTRACT

A remote controlled destruct system for aircraft or the like having fuel cells within critical structures. The filler cap in at least one fuel cell is replaced by a unique explosive device connected to remotely controllable firing means.

6 Claims, 5 Drawing Figures

Patented May 22, 1973  3,734,429

INVENTORS.
LLOYD J. HOLT
HARRY L. MYERS
GORDON F. ZURN, JR.
BY: ROY MILLER
ATTORNEY.
GERALD BAKER
AGENT.

Patented May 22, 1973 3,734,429

TARGET AIRCRAFT FLIGHT TERMINATION SYSTEM

CROSS REFERENCES TO RELATED APPLICATIONS

The present system is designed to replace such prior systems as that described in U. S. Pat. No. 3,311,324 issued to Lloyd J. Holt et al. Mar. 28, 1967. The explosive device per se is the subject of assignee's copending application Ser. No. 163,228 filed July 16, 1971.

BACKGROUND OF THE INVENTION

The present invention relates to target aircraft and other aircraft or the like and more particularly to a means and method of severing airframe elements such as wings from aircraft. When aircraft are flying without a live operator either by design or by emergency evacuation, there may occur times when an out of control aircraft trajectory endangers life or property. Under such circumstances, it may be desirable to control flight termination within a prescribed impact area.

This problem and one solution therefore in a drone aircraft situation has been adequately covered in the above mentioned patent to Lloyd J. Holt et al. Patentees' device, as described in the aforementioned patent, has been in use for a number of years at the Naval Weapons Center, China Lake. However, the prior system presented not a few drawbacks in additional weight and aerodynamic instability added to the aircraft. The prior apparatus was relatively cumbersome and took some time to install on the aircraft.

According to the present invention, a destruct system is provided which adds negligible amounts of weight and drag to the aircraft. The present system involves placing a unique explosive charge in place of the filler cap in one or more fuel cells occupying space in a critical airframe component such as a wing. System redundancy, if desired, is easily accomplished, for example, by placing an explosive charge in each of opposing airframe structures. Explosive units are connected by a unique detonation train to a safe and arm (S+A) device of single line detonation type which is located separately from the main charge in a protected area.

A UHF command destruct signal receiver is installed in the after cockpit, for example, to decode four outputs in response to frequency modulation of the RF input. Arm, dearm, and destruct signal output logic is provided in the form of relay closures from the decoder section of the receiver.

The destruct system according to the present invention provides capabilities, (either wing destruction would cause flight termination) with the explosive mounted in an unexposed area. Minimal amounts of explosive are required because of the radial explosive effect of the charge. The invention encompasses the main charge construction, safe/arm construction, method of mounting, location of the explosive, the actuating circuitry and the electrical circuits which prevent shorting of the complete system by failure of one side when a missile hit or component failure is encountered.

DETAILED DESCRIPTION OF A PREFERRED EMBODIMENT

Figure 1:
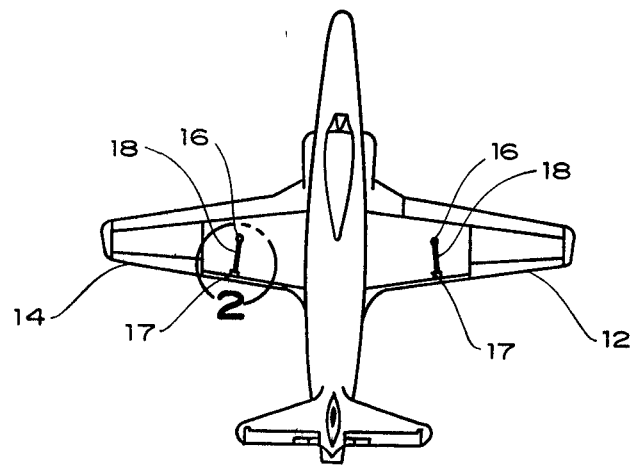
FIG. 1 is a plan view of a typical aircraft equipped with an embodiment of the invention.

By way of example, the invention will be described in relation to a conventional monoplane target such as shown at 10 in FIG. 1. For the sake of redundancy, a unit has been placed on each of wings 12, 14 of the target aircraft 10. Each wing 12, 14 has a plug 16 of explosive material inserted into a fuel cell and the explosive devices 16 are connected to safe and arm devices 17 by an explosive train 18.

Figure 2:
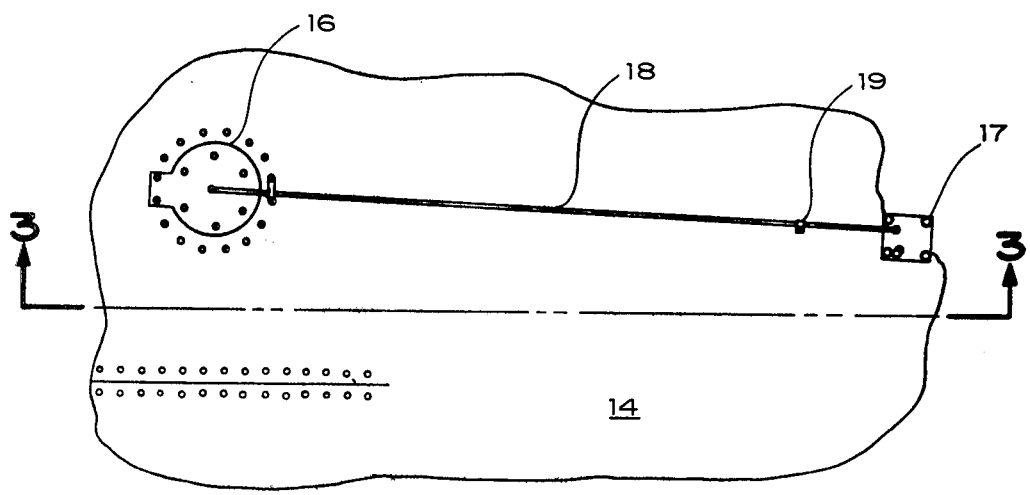
FIG. 2 is a plan view of the portion of the airframe indicated at 2 in FIG. 1.

A closer look at this arrangement is shown in FIG. 2 which shows the flush mounting of the top of explosive device 16 and the S+A device 17.

Figure 3:
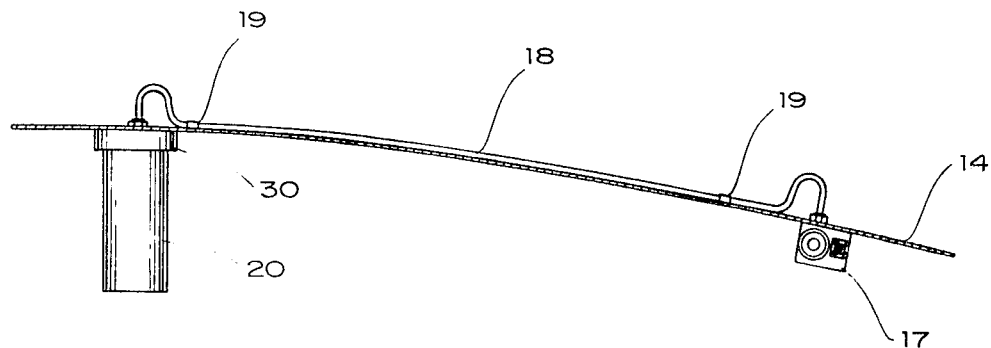
FIG. 3 is a side elevational view taken along the line 3 — 3 of FIG. 2.

FIG. 3 shows the explosive charge device and the S+A device in side elevation. The explosive detonation train 18 is fastened to the skin 14 of the aircraft and has smooth radius bends at each end in a pattern to prevent a right angled connection which might be conducive to failure.

Figure 4:
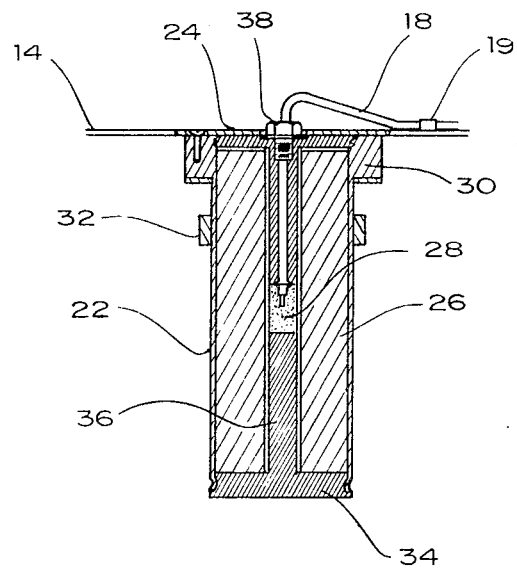
FIG. 4 is a longitudinal cross section view of a typical explosive charge useable with the invention.

One embodiment of the explosive device is shown in cross section in FIG. 4 and illustrates a further method of connecting the explosive train 18 to the explosive device without a right angled connection. The canister 22 is the same diameter as a conventional filler plug but is a little more than twice the usual length. The hollow canister contains an explosive cylinder 26 surrounding the posts 36, 36' which depend from anvils 30, 34. The posts 36, 36' are of such length that an opening is left in the center cavity sufficient to contain a booster pellet 28. Post 36' is bored to receive one end of the detonating cord and is counterbored and tapped to receive a fitting 38 to fasten the detonating cord to the upper anvil end piece 30. The canister carries the usual locking lugs 32 to fasten the device in the filler well of a fuel tank.

Figure 5:
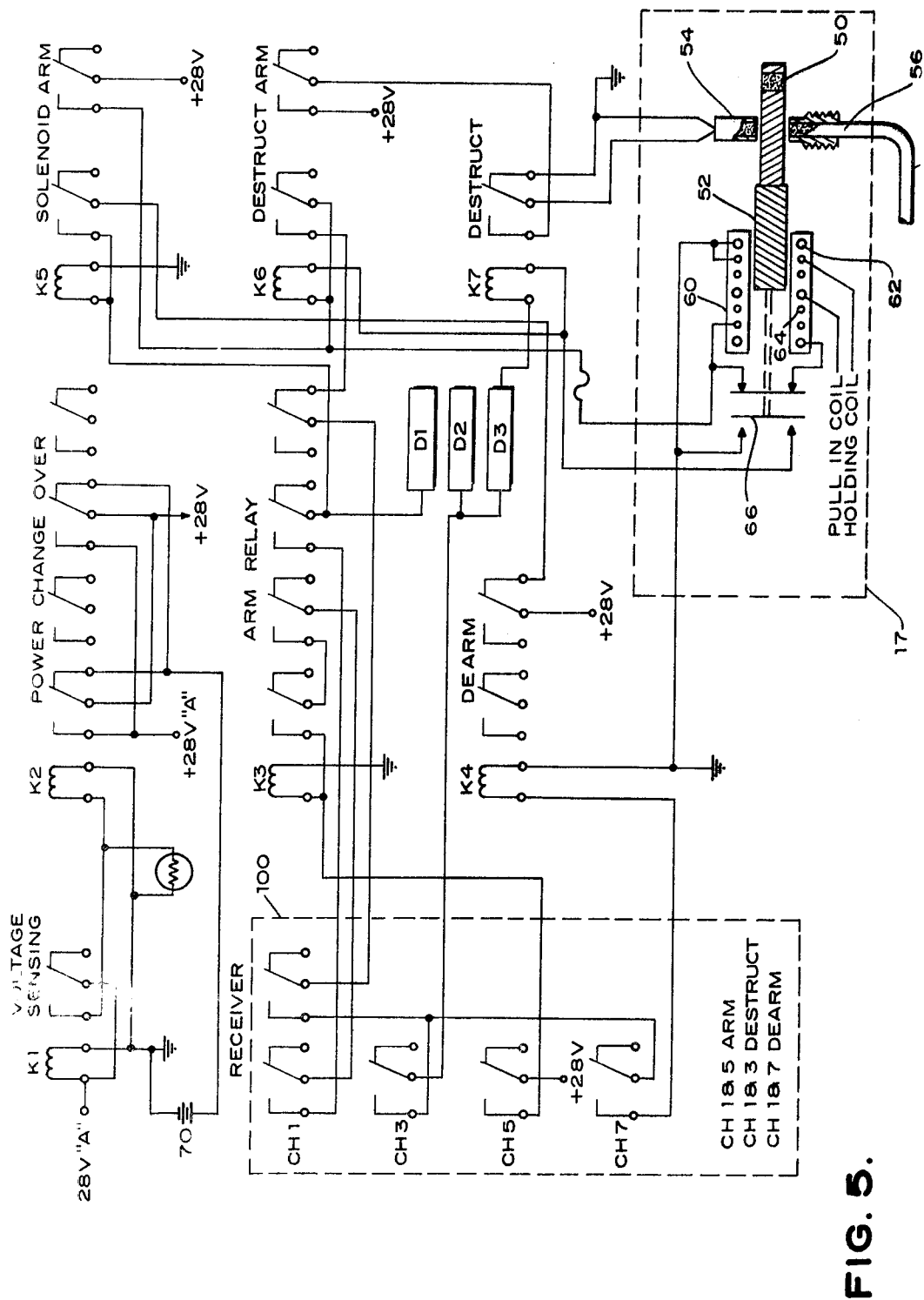
FIG. 5 is a schematic illustration of the electrical firing circuitry in conjunction with a unique safe and arm device.

A schematic illustration of the S+A device and the interconnecting wiring of the destruct system is shwon in FIG. 5, in the nonarmed or safe condition. It will be noted that the explosive 50 on plunger 52 is out of line with the electrical detonator 54 and the detonating cord 56. When, however, the coils 62, 64 of solenoid 60 are energized the plunger 52 is drawn to the left as seen in FIG. 5 sufficient for the explosive 50 to be in line with the detonator 54 and the end 56 of detonating cord 18.

OPERATION

When the proper signals are received by receiver 100, a combination of channel switches 1, 3, 5 or 7 may be actuated to the position reverse from that shown in the diagram. In the embodiment shown, two channels must be actuated simultaneously for the system to arm, destruct or dearm. With the system in dearm position as shown, it is necessary to activate channels 1 and 5 to change the system condition to ARM. Shifting of the switches in channel 1 and 5 results in 28 volts going through the channel 5 relay to operate relay $K_3$ and to supply voltage to the first relay position of $K_3$. Through the first and second positions of relay $K_3$ voltage is then supplied through the switches in channel 1 to the third position of $K_3$ and through that position to delay line $D_1$, the function of which will be explained below.

Voltage is also supplied through the third position of $K_3$ to actuate the relay $K_5$ and relay $K_5$, in turn, actuates a first relay position to hold power on the actuated relay $K_5$ through a 28 volt supply in $K_4$. Relay $K_3$ is not held and returns to normal when actuating power is removed. $K_5$ and its second position relay supplies 28 volts to the center position of the first relay in $K_6$ and to the solenoid pull-in coil 64 and holding coil 62. When solenoid plunger 52 is operated, it moves switch 66 to open the circuit to the pull-in coil 62 and supplies a ground connection to one side of relay $K_7$ and $K_6$. The other side of relay $K_7$ one side of $K_6$ is connected through delay means $D_3$ to the center position of channel 3 in the receiver. At this time, however, no power is available to $K_7$ because channel 3 has not been actuated and the switch member of $K_7$ remains in a position to ground both sides of the circuit to squib 54. At this time the circuit is ready to be fired when relay $K_7$ is operated.

With the system an ARM position, relay $K_7$ may be actuated by remote operation of channels 1 and 3 in receiver 100. The second position of channel 1 which has its center post connected through the fourth position of inactive relay $K_3$ and the first position of Holding relay $K_6$ is supplied with 28 volts through the second position of relay $K_5$. This voltage is then passed through the switch in channel 3 to the delay means $D_3$. After a one second delay the relay $K_7$ will be actuated and switch one lead of the squib circuit to 28 volts firing voltage supplied through the second position of holding relay $K_6$, and $K_7$, thus firing detonator 54.

Should the occasion arise, during a time when the system is in ARM position, that it is desirable to dearm the system, the system may be returned to normal or standby position by actuating channels 1 and 7. The second position of channel 1 will supply 28 volts as described in the "destruct" mode with respect to channel 3 above. In this case, however, the voltage passing through channel 7 will actuate relay $K_4$ which takes the voltage from the line holding through the first position of $K_5$ and relays $K_5$ and $K_6$ will therefore return to normal position. The second position of solenoid $K_5$ removes voltage from solenoid holding coil 64 and the solenoid plunger returns to normal and through switch 66 breaks the ground circuit to relays $K_6$ and $K_7$ and restores the original solenoid operating circuitry.

So that the firing circuitry will operate independent of aircraft power, a voltage sensing relay $K_2$ and a power change over relay $K_2$ are provided to change over automatically from aircraft power "A" to voltage from battery 70. From the foregoing it may be seen that relays in channels 1 and 5 must be released before destruct sequence can be actuated.

Upon actuation of detonator 54, the explosive 26 is set off through the action of the explosive material in the confined detonating cord 18 and booster pellet 28. The metal anvil members 30, 34 serve to shape the explosive force expended into a flat disc contour which is very effective in destroying the surrounding structure to disable the aircraft.

What is claimed is:

1. In a remotely controlled aircraft destruct system in combination:

an aircraft having two opposing airframe structures:
   a fuel cell having a filler opening in each said airframe structure;
   an explosive device mounted in the filler opening of at least one said fuel cell;
   a SAFE and ARM (S+A) device spaced from said filler opening;
   a confined explosive train interconnecting said explosive device and said S+A device;
   means on said aircraft electrically connected to said S+A device to ARM said explosive device on receipt of a predetermined signal; and
   means operative only when said device is in ARM position to either return said system to SAFE or to detonate said device.

2. The system of claim 1 wherein said S+A device includes:

explosive initiation means in line with and spaced from one end of said explosive train;
   a plunger containing a passageway filled with explosive material and movable from a position, out of line with said explosive initiation means and said one end of said explosive train to a position between and in line with said explosive initiation means and said one end of said explosive train.

3. A destruct system for aircraft or the like having fuel cells in critical opposing airframe structures thereof comprising;

each said fuel cell having a filler opening;
   an explosive device fitted into the filler opening in at least one fuel cell;
   a SAFE and ARM (S+A) device spaced from said explosive device;
   a confined detonation train interconnecting said explosive device and said S+A device; and remote control means including coded receiver means in the aircraft or the like electrically connected to said S+A device so that;
   when predetermined coded signal is received, said explosive device will be detonated through said confined detonation train and said S+A device.

4. The system of claim 3 further including explosive devices in each of two spaced apart structures.

5. The system of claim 3 wherein said explosive device comprises:

a toroidal explosive portion; top and bottom anvil portions and a centrally located booster pellet.

6. The system of claim 5 further including explosive devices in each of two spaced apart structures.

* * * * *